(12) United States Patent
Curran et al.

(10) Patent No.: US 7,020,068 B2
(45) Date of Patent: Mar. 28, 2006

(54) ECHO AND CROSSTALK CANCELLATION

(75) Inventors: Philip Curran, Dublin (IE); Albert Molina, Madrid (ES); Brian Murray, Dublin (IE); Carl Murray, Dublin (IE)

(73) Assignee: Massana Research Limited, Dublin (IE)

(*) Notice: Subject to any disclaimer, the term of this patent is extended or adjusted under 35 U.S.C. 154(b) by 992 days.

(21) Appl. No.: 09/843,909

(22) Filed: Apr. 30, 2001

(65) Prior Publication Data

US 2001/0036160 A1   Nov. 1, 2001

(30) Foreign Application Priority Data

Apr. 28, 2000   (IE)  ................................ 2000/0320

(51) Int. Cl.
*H04B 7/015*   (2006.01)
(52) U.S. Cl. .................. 370/201; 370/290; 370/292; 379/406.08; 379/406.1
(58) Field of Classification Search ............... 370/201, 370/286–290; 439/941; 324/628
See application file for complete search history.

(56) References Cited

U.S. PATENT DOCUMENTS

| | | | | |
|---|---|---|---|---|
| 5,483,551 A | * | 1/1996 | Huang et al. | 375/219 |
| 5,675,644 A | * | 10/1997 | Sih | 379/406.08 |
| 5,970,088 A | * | 10/1999 | Chen | 375/222 |
| 6,240,133 B1 | * | 5/2001 | Sommer et al. | 375/232 |
| 6,377,640 B1 | * | 4/2002 | Trans | 375/354 |

* cited by examiner

*Primary Examiner*—Alpus H. Hsu
*Assistant Examiner*—Justin M Philpott
(74) *Attorney, Agent, or Firm*—Jacobson Holman PLLC

(57) ABSTRACT

A cancellation system comprises a channel circuit (11) for each noise source, such as echo in a particular cable pair. There are only eighty taps per channel, in two blocks (n_echo_a, f_echo_a). Each block is preceded by a variable delay line comprising blocks of registers cascaded so that a delay value of 0 to 40 clock cycles can be chosen. The delay value is determined by determining an optimum position for each tap block. This is achieved by determining a maximum coefficient sum for a number of windows. Taps from other channels are used during training, so that there is a total of 160 taps for each channel during training to enable the optimum positions to be determined.

19 Claims, 5 Drawing Sheets

ECHO AND CROSSTALK CANCELLATION

FIELD OF THE INVENTION

The invention relates to cancellation of echo and crosstalk in high-speed networks such as 1 Gb/s networks.

PRIOR ART DISCUSSION

Taking the example of 1 Gb/s networks, there are typically four cable pair channels, say A, B, C, and D. Each pair is used for both transmit and receive. Due to mismatches in the cable impedance there is an echo returned to the receiver. These mismatches may occur at junctions and patch cords. In addition, the transceiver hybrid only partially attenuates the locally transmitted signal. This combination is known as the echo signal and it appears as a noise source to the receiver.

Because there are four pairs of unshielded cable there is the additional problem of crosstalk. The other three transmitters (at the same end as the receiver) all generate interference signals known as near-end crosstalk (NEXT). Furthermore, the three transmitters at the far end generate interference signals known as far-end crosstalk (FEXT). In summary, each receiver has to cope with interference signals from seven other transmitters, namely one echo from the transmitter on the same pair, three NEXT from the transmitters on the same end and three FEXT from the three transmitters at the far end.

Heretofore, the approach to deal with these interference signals has been to generate a replica signal to the noise source and to subtract it from the received signal. This is possible because the four near transmit signals are known, and the three far transmit signals can be deduced. The corresponding noise signal due to any given transmit signal can be approximated at the receiver using the transmit signal as the starting point. This is usually done using an adaptive finite impulse response filter ("adaptive FIR filter" or "AFIR"), one for each of the noise sources, and the input to each AFIR is the corresponding transmit signal. The coefficients of each AFIR are adapted to minimise the difference (MSE—mean square error) between the received signal plus the total noise signal less the output of the AFIR (which is an approximation to the noise signal corresponding to that transmit signal).

The AFIR filter that cancels the echo is known as an "echo canceller", and likewise there are NEXT cancellers and FEXT cancellers. Thus, for a complete Gigabit transceiver, a total of four echo cancellers, twelve NEXT cancellers and twelve FEXT cancellers are required to cancel all of the noise sources.

A problem with the above approach is that it is a very large and complex system and is expensive in terms of computational complexity, silicon area, and power consumption. At a 125 M symbols per second rate the span of the echo cancellers (i.e. number of taps) is very large, at a 125 MHz sample rate an individual multiplier and adder is required for each tap. In addition a coefficient adaptation circuit is required for each tap. Likewise the span of the NEXT and FEXT cancellers is also very large.

It is known that though the span of an echo canceller required to cancel echo for a given system may need to be very large it is usual that not all of the taps are necessary. The difficulty lies in identifying which taps are necessary and which are not as this will vary from cable to cable and indeed may vary from time to time. This is known to also be a problem in acoustic echo cancellers. A method of tackling this problem has been proposed in WO99/46867 (Broadcom, Gigabit Ethernet Transceiver), in which after the echo canceller has been trained a certain number of taps are switched off. A method is described to determine which taps are important and which are not making a significant contribution to noise reduction. This method has the advantage of reducing the power dissipation of the circuit, though no reduction in area is achieved (in fact area appears to be increased).

The invention is directed towards providing improved echo and crosstalk cancellation.

SUMMARY OF THE INVENTION

According to the invention, there is provided a cancellation system for echo or crosstalk noise in a communication transceiver for a plurality of channels, the system comprising a channel circuit comprising taps for each channel and means for training the taps by setting coefficient values, characterised in that:

at least some of the channel circuits each comprise insufficient taps for a full span;

each of said channel circuits further comprises a variable delay line connected in series with the taps; and the training means comprises means for setting length of each variable delay line so that positions of the taps are optimised.

In one embodiment, the training means comprises means for sharing taps from another channel circuit when training each channel circuit in order to achieve a full span for each channel during training.

In another embodiment, each channel circuit comprises a plurality of variable delay lines separated by taps.

In a further embodiment, the taps are arranged in at least one block having a fixed number of taps.

In one embodiment, the training means comprises means for determining an optimum position for each tap block to set the length of the variable delay line.

In another embodiment, the training means comprises means for determining a coefficient sum for each of a plurality of candidate windows, and choosing the window providing the maximum coefficient sum.

In a further embodiment, the training means comprises means for determining an optimum position for each block subject to pre-set constraints.

In one embodiment, a constraint is a maximum length for the variable delay line.

In another embodiment, a constraint is that tap blocks do not overlap.

In one embodiment, each channel circuit comprises, in series: a near variable delay line, a near tap block, a far variable delay line, and a far tap block.

In another embodiment, each variable delay line comprises cascaded register blocks linked by multiplexers comprising means for bypassing a register block or feeding data through it according to training control signals setting a delay length.

In one embodiment, the training means comprises an adaptation module for at least one tap block.

In another embodiment, at least some adaptation modules comprise means for training two or more tap blocks.

According to another aspect, the invention provides a cancellation system for echo or crosstalk noise in a communication transceiver for a plurality of channels, the system comprising a channel circuit comprising taps for each channel and means for training the taps by setting coefficient values, characterised in that:
   at least some of the channel circuits each comprise insufficient taps for a full span;
   each of said channel circuits further comprises a variable delay line connected in series with the taps;
   the training means comprises means for sharing taps from another channel circuit when training each channel circuit in order to achieve a full span for each channel during training; and
   the training means comprises means for determining an optimum position for each tap block to set the length of the variable delay line, said means comprising means for determining a coefficient sum for each of a plurality of candidate windows, and choosing the window providing the maximum coefficient sum.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Figure 1:
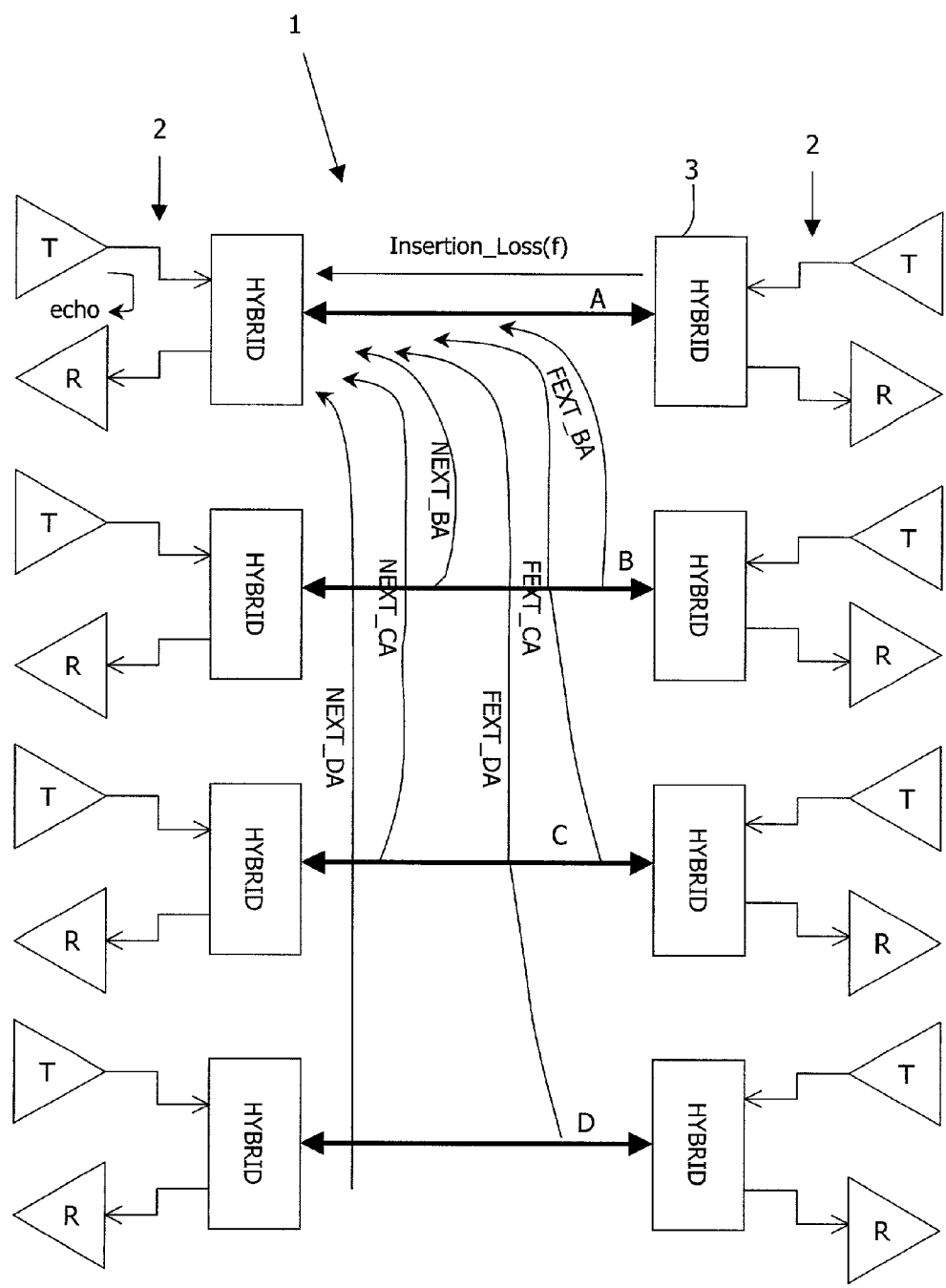
FIG. 1 is a diagram illustrating sources of noise to be cancelled.

Referring to FIG. 1 a Gigabit system 1 comprises four cable pair channels A, B, C, and D and a transceiver 2 at each end. Each transceiver 2, at a high level, comprises a transmitter T, a receiver R, and a hybrid 3 physically connected to each cable A, B, C, and D. The echo and crosstalk sources for the left side transceiver 2 for cable pair A are illustrated by arrows. There are three FEXT interferances FEXT_BA, FEXT_CA, and FEXT_DA, three NEXT interferances NEXT_BA, NEXT_CA, and NEXT_DA, and finally, there is an echo in the receiver R from the associated transmitter T and from points of impedance mis-match along the cable.

The invention provides an echo and NEXT cancellation system for each transceiver 2. Each cancellation system comprises an echo canceller for dealing with echo in all of the four cable pairs, and a NEXT canceller for dealing with the twelve sources of NEXT. The echo canceller is illustrated, the structure and principles of operation for the NEXT canceller being similar.

Figure 2:
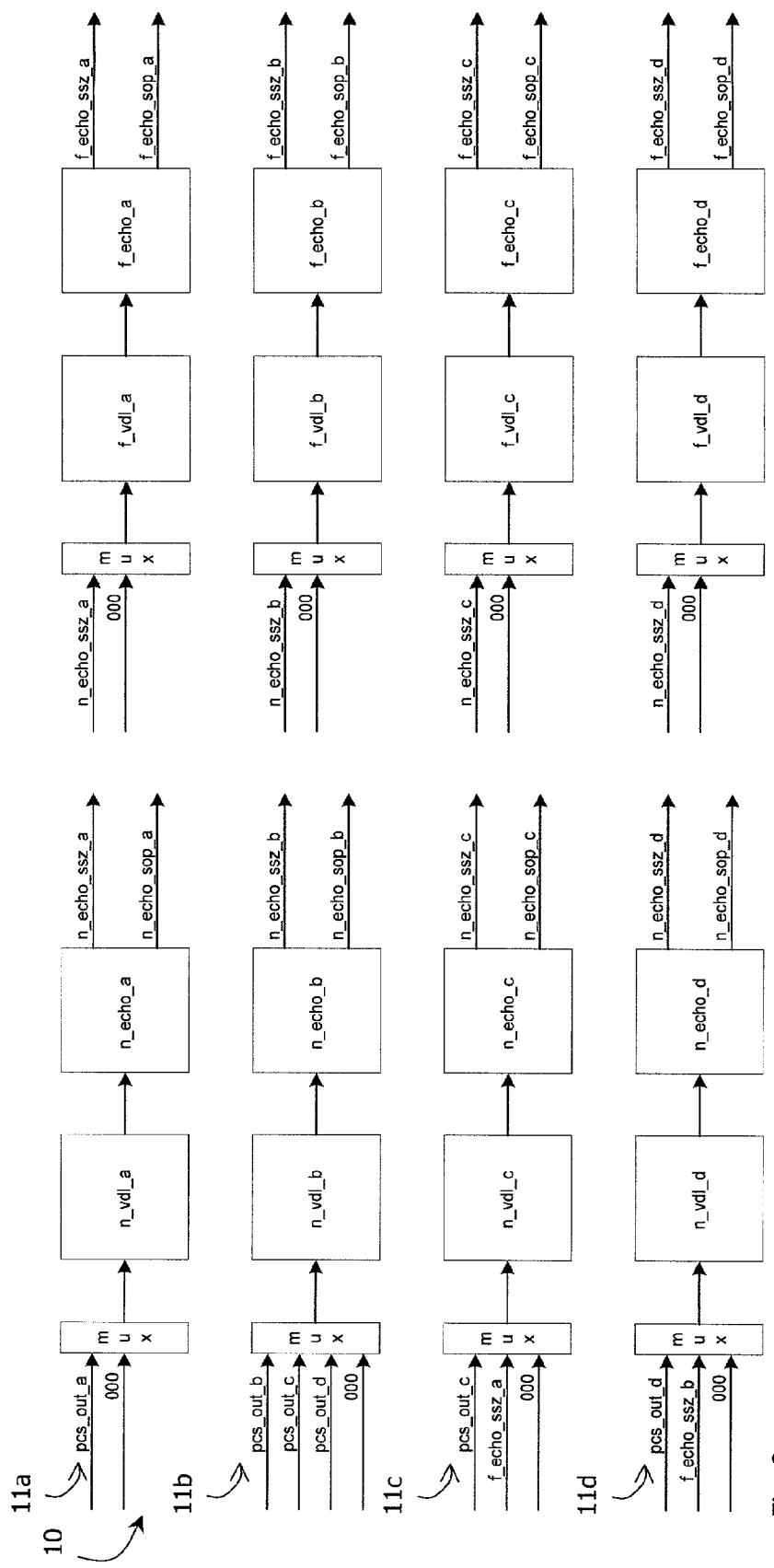
FIG. 2 is a block diagram of an echo canceller of a cancellation system.

Referring to FIG. 2 an echo canceller 10 is illustrated. It comprises a cancellation circuit 11 for each of the four cable pair channels A, B, C, and D. Each channel circuit 11 comprises, referring to the first circuit 11a:
   a near variable delay line, n_vdl_a,
   a near block of 40 canceller taps, n_echo_a,
   a far variable delay line, f_vdl_a, and
   a far block of 40 canceller taps, f_echo_a.
The letter "a" is substituted by "b", "c", and "d" for the second, third and fourth circuits 11 respectively.

Each circuit 11 also comprises a multiplexer "mux" before each variable delay line to allow interconnection of the circuits 11 for training purposes.

The NEXT canceller of the cancellation system comprises twelve circuits equivalent to the circuits 11.

Within each of the tap blocks n_echo_a and f_echo_a there is a fixed block of forty taps. The term "tap" in this context means a canceller comprising a register for data, a register for a coefficient, and a multiplier for multiplying the data and the coefficient. Each block of taps also comprises a summing unit for summing 40 multiplier products. The summing unit is also referred to as a sum-of-product (SOP) block.

However, each variable delay line comprises only 40 registers and thus requires much less silicon than a block of 40 taps.

The echo canceller 10 is for situations in which a span of 160 taps is conventionally required for each channel. However, as described above there is only a total of 80 taps plus two variable delay lines for each channel. The canceller 10 achieves a performance close to or matching that of a canceller having 160 taps for each channel because of the manner in which it is trained, as described below.

Figure 3:
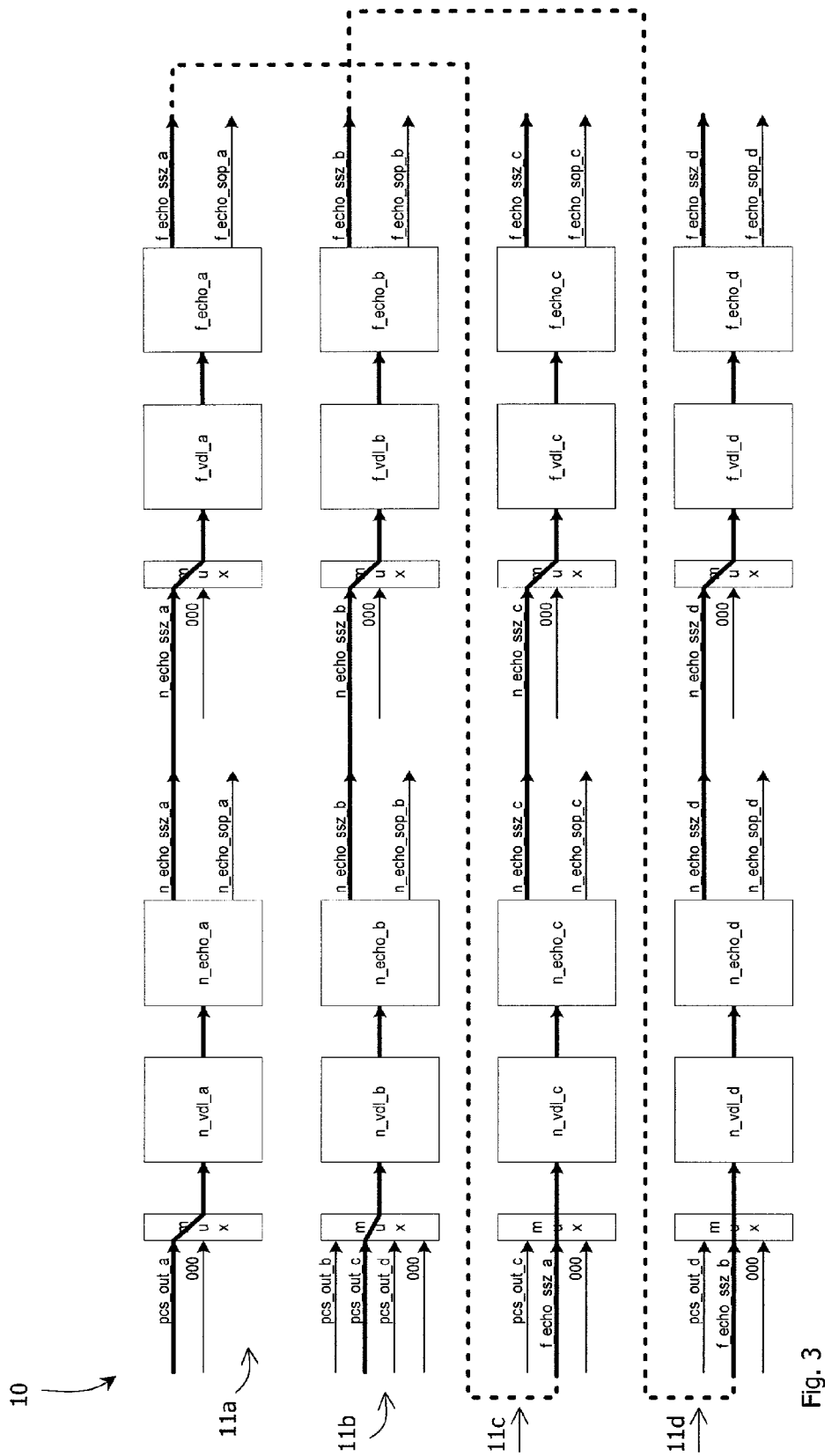
FIG. 3 is a diagram showing interconnection of parts of the echo canceller during training.
Figure 4:
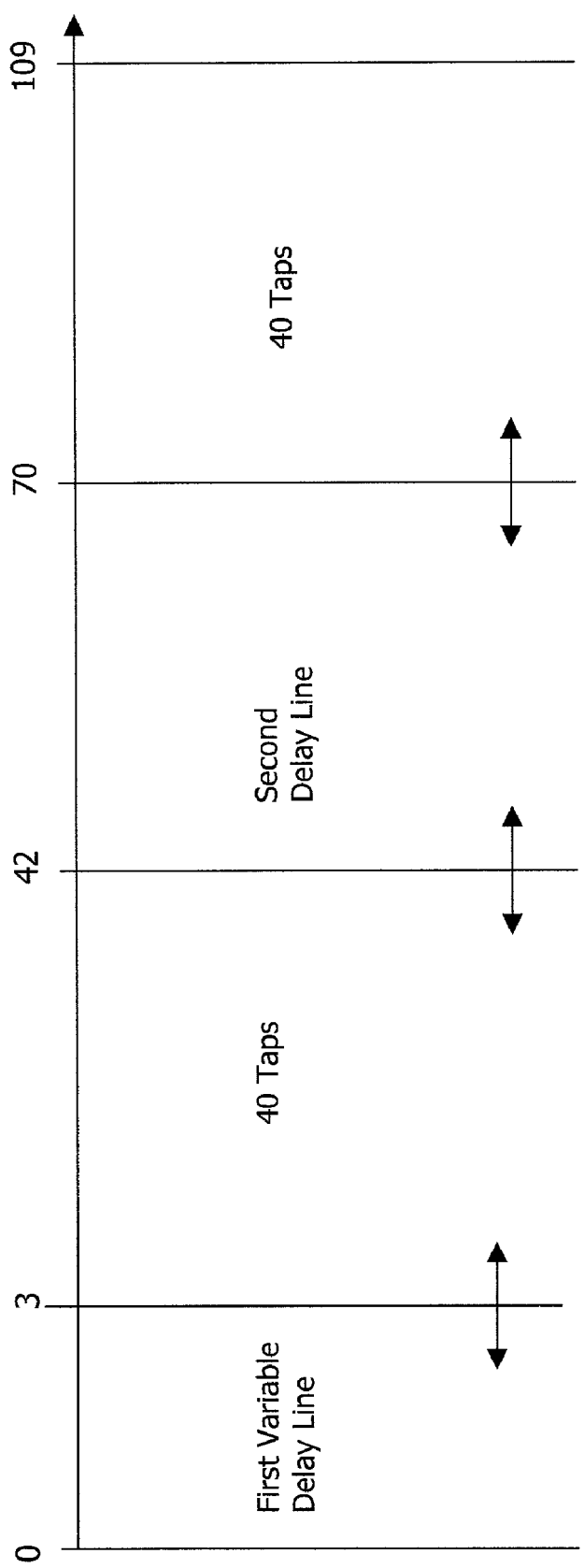
FIG. 4 is a diagrammatic representation showing setting of variable delay line lengths.

During training, the adaptation engine adapts the 160 coefficients to generate a replica noise signal. A full span of 160 taps is possible because the taps from two circuits 11 are shared during training to achieve the full span. Referring to FIG. 3, the output from f_echo_a is routed to n_echo_c via n-vdl_c. Thus the training circuit for each echo source comprises four sets of 40 taps, and four variable delay lines all set to zero delay during training. Thus, during training a combination of two circuits 11 simulates a conventional circuit having 160 taps. The coefficient value at each tap is then processed as follows, with reference to FIG. 4:

A window of positions 0–39 is analysed by summing the coefficients, and this is repeated for positions 1–40 and so on until positions 40–79. There are 40 coefficient sums, one for each of these windows.

The window having the highest value is chosen for the near block of taps, in this example window 3–42. The value for the near variable delay line is set by the start position of the near tap block window, in this example 3.

A window of 40 positions starting at tap 43 (43–82) is then analysed by summing the values for all positions. Then the summed value for positions 45–84 is determined, and so on for each successive window of 40 positions. The window having the highest value is determined to be the most effective position for the far block of 40 taps and the gap between it and the near set is by default the length of the far variable delay line.

The purpose of the tap selection process is to select the optimum position of the two tap blocks under the following constraints.

The delay between the data stream and the input to the first delay line is in the range 0 to 8 (to adjust possible phase differences among channels).

The delay between the delay line output of the first tap block and the delay line input of the second block is in the range 0 to 40 for a NEXT canceller and 0 to 80 for an echo canceller.

The position of a tap block is considered optimum if the sum of the absolute value of its coefficients is maximum for all possible positions of the block SOP.

The position of the near block is chosen first. The position of the far block is relative to the selected position of the near block.

The tap blocks cannot overlap.

The tap selection process is called for each channel separately. The taps for the different SOP blocks are selected in the following sequence.

near echo canceller SOP
far echo canceller SOP
near next canceller SOP for 'first' next canceller
far next canceller SOP for 'first' next canceller
near next canceller SOP for 'second' next canceller
far next canceller SOP for 'second' next canceller
near next canceller SOP for 'third' next canceller
far next canceller SOP for 'third' next canceller The procedure for selecting the position is the same for any SOP. The sum of the absolute value of the coefficients for the first possible position of the SOP is determined. The sum of the absolute value of the coefficients for the next possible position is then determined by subtracting the absolute value of first coefficient in the sum and adding the absolute value of the next coefficient. If this value is greater than the previous one then the current position is optimum. This process is repeated until all possible positions for the canceller have been considered.

Two signals recfg_ctr_active and coef_en are required by all adaptation engines to allow the hardware to be reconfigured to facilitate resource sharing. They are used to control resetting the tap coefficients and switching between adaptation of two filters sharing the same adaptation engine.

During the adaptation period at the very beginning the canceller sharing procedure is as follows.

Channel A borrows cancellers from channel C.
Channel B borrows cancellers from channel D.
Channel C uses channel B and D's cancellers.
Channel D borrows cancellers from channel B.

The purpose of the first adaptation stage is to determine the optimum position of the tap (canceller) coefficients within certain constraints. Effectively each canceller has two sum of product (SOP) blocks of equal size. The first block can be placed on the canceller delay line at delays of 0 to 8 clock cycles. The second can be placed on the delay line after the first with delays of 0 to 80 clock cycles for echo cancellers and 0 to 40 clock cycles for NEXT cancellers. During this first stage of adaptation cancellers are borrowed from other channels so that the whole delay line can be spanned. A decision is then made as to where the tap blocks should be placed for the next stage of adaptation.

In the second stage of adaptation the coefficients of the taps continue to be adapted to track changes in the channel.

The canceller variable delay lines on reset are configured with delays of zero. The tap adaptation engine determines appropriate delays for these delay lines. However these calculated values may be overwritten by values written via a management interface.

Regarding the NEXT canceller circuits, as described above there are twelve channel circuits each similar in architecture to the echo channel circuits 11. The NEXT cancellers are grouped in the following manner.

Group 1
Next canceller for channel A due to transmission on channel B.
Next canceller for channel B due to transmission on channel A.
Next canceller for channel C due to transmission on channel A.
Next canceller for channel D due to transmission on channel A.

Group 2
Next canceller for channel A due to transmission on channel C.
Next canceller for channel B due to transmission on channel C.
Next canceller for channel C due to transmission on channel B.
Next canceller for channel D due to transmission on channel B.

Group 3
Next canceller for channel A due to transmission on channel D.
Next canceller for channel B due to transmission on channel D.
Next canceller for channel C due to transmission on channel D.
Next canceller for channel D due to transmission on channel C.

By grouping canceller taps in this manner adaptation resources can be easily shared during training.

Figure 5:
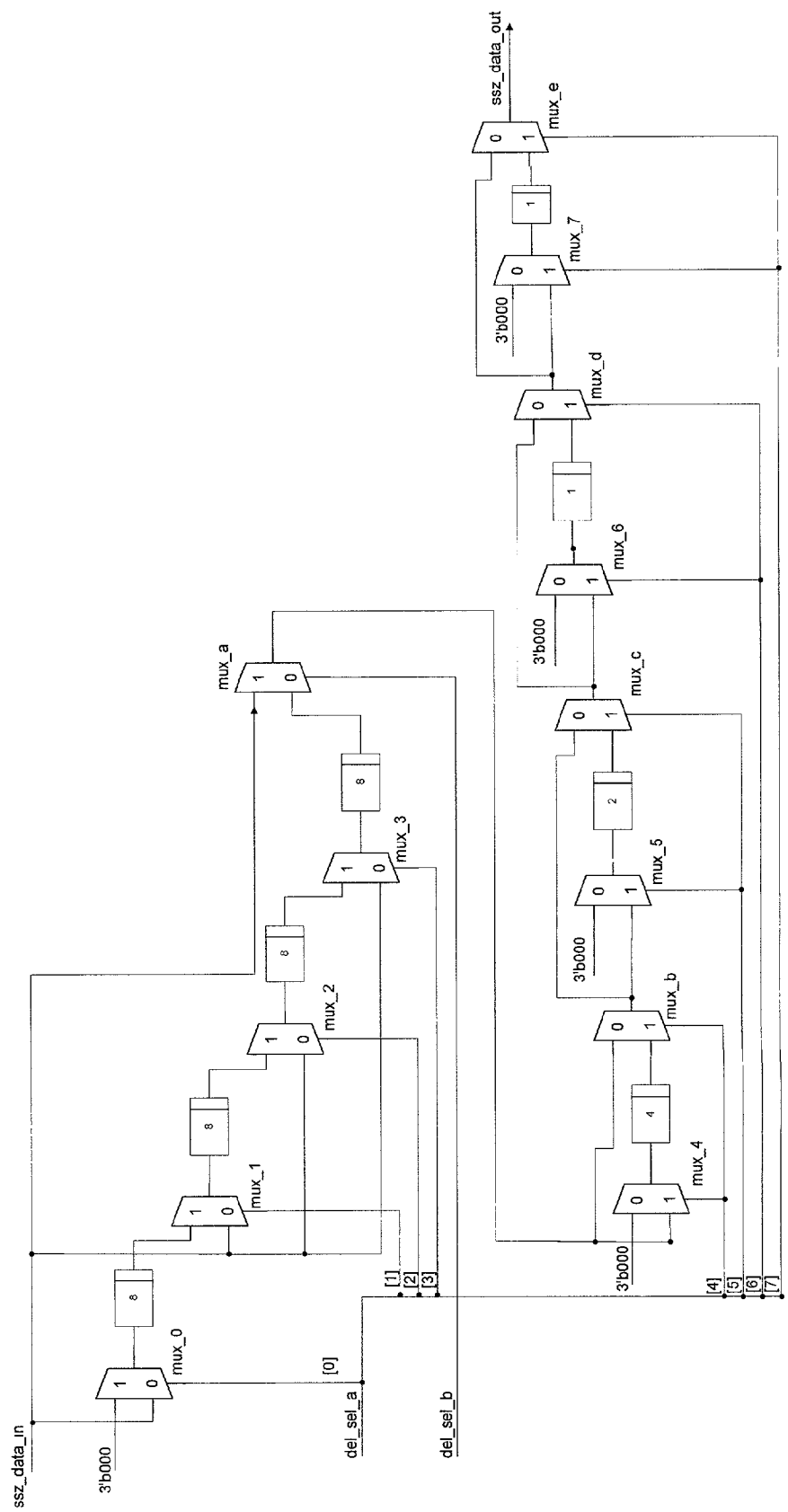
FIG. 5 is a diagram illustrating a variable delay line in detail.

Referring to FIG. 5, a variable delay line is illustrated. There is a total of 40 registers in four blocks of 8, one block of 4 and four blocks of 1. Control signals del_sel are used to set multiplexers mux_0 to mux_7 to either bypass a particular register block or feed the data through it to achieve the required delay.

An adaptation module can be dedicated to each block of taps or shared between blocks. For example, there may be a shared adaptation module for two blocks of taps, namely one for n_echo_a/n_echo_b, one for f_echo_a/f_echo_b, one for n_echo_c/n_echo_d, and one for f_echo_c/f_echo_d.

The invention is not limited to the embodiments described but may be varied in construction and detail.

The invention claimed is:

1. A cancellation system for echo or crosstalk noise in a communications transceiver for a plurality of channels, the system comprising:
   a channel circuit including taps for each channel and means for training the taps by setting coefficient values, the taps being arranged in at least one block having a fixed number of taps;
   at least some of the channel circuits each having insufficient taps for a full span;
   each of said channel circuits further including a variable delay line connected in series with the taps; and
   the training means including means for determining an optimum position for each tap block to set the length of each variable delay line.

2. The cancellation system as claimed in claim 1, wherein the training means is configured to share taps from another channel circuit when training each channel circuit in order to achieve a full span for each channel during training.

3. The cancellation system as claimed in claim 1, wherein each channel circuit includes a plurality of variable delay lines separated by taps.

4. The cancellation system as claimed in claim 1, wherein the training means is configured to determine a coefficient sum for each of a plurality of candidate windows, and choosing the window providing the maximum coefficient sum.

5. The cancellation system as claimed in claim 1, wherein the training means is configured to determine an optimum position for each block subject to pre-set constraints.

6. The cancellation system as claimed in claim 5, wherein a constraint is a maximum length for the variable delay line.

7. The cancellation system as claimed in claim 5, wherein a constraint is that tap blocks do not overlap.

8. The cancellation system as claimed in claim 1, wherein each channel circuit includes, in series, a near variable delay line, a near tap block, a far variable delay line, and a far tap block.

9. The cancellation system as claimed in claim 1, wherein each variable delay line has cascaded register blocks linked by multiplexers including means for bypassing a register block or feeding data through said register block according to training control signals setting a delay length.

10. The cancellation system as claimed in claim 1, wherein the training means includes an adaptation module for at least one tap block.

11. The cancellation system as claimed in claim 10, wherein at least some adaptation modules include means for training two or more tap blocks.

12. A cancellation system for echo or crosstalk noise in a communication transceiver for a plurality of channels, the system comprising:
- a channel circuit including taps for each channel and means for training the taps by setting coefficient values;
- at least some of the channel circuits each having insufficient taps for a full span;
- each of said channel circuits further including a variable delay line connected in series with the taps; and
- the training means including means for sharing taps from another channel circuit when training each channel circuit in order to achieve a full span for each channel during training.

13. The cancellation system as claimed in claim 12, wherein the training means further includes means for determining an optimum position for each tap to set the length of the variable delay line.

14. The cancellation system as claimed in claim 13, wherein the means for determining includes means for determining a coefficient sum for each of a plurality of candidate windows, and choosing the window providing the maximum coefficient sum.

15. The cancellation system as claimed in claim 13, wherein the training means includes means for determining an optimum position for each block subject to pre-set constraints.

16. The cancellation system as claimed in claim 15, wherein a constraint is a maximum length for the variable delay line.

17. The cancellation system as claimed in claim 15, wherein a constraint is that tap blocks do not overlap.

18. A cancellation system for echo or crosstalk noise in a communications transceiver for a plurality of channels, the system comprising:
- a channel circuit having taps for each channel and a tap coefficient training circuit for training the taps by setting coefficient values, each channel circuit including, in series, a near variable delay line, a near tap block, a far variable delay line, and a far tap block;
- at least some of the channel circuits each having insufficient taps for a full span; and
- the tap coefficient training circuit being configured to set a length of each variable delay line so that positions of the taps are optimised.

19. A cancellation system for echo or crosstalk noise in a communications transceiver for a plurality of channels, the system comprising:
- a channel circuit having taps for each channel and a tap coefficient training circuit for training the taps by setting coefficient values, each channel circuit including, in series, a near variable delay line, a near tap block, a far variable delay line, and a far tap block;
- at least some of the channel circuits each having insufficient taps for a full span;
- each of said channel circuits further including a variable delay line connected in series with the taps;
- the tap coefficient training circuit being configured to set a length of each variable delay line so that positions of the taps are optimised; and
- each variable delay line having cascaded register blocks linked by multiplexers including means for bypassing a register block or feeding data through said register block according to training signals setting a delay length.

* * * * *